United States Patent
Tosato

(10) Patent No.: US 10,969,477 B2
(45) Date of Patent: Apr. 6, 2021

(54) METHOD TO DETECT A SIGNAL AND OPTOELECTRONIC SENSOR

(71) Applicant: DATALOGIC IP TECH S.R.L., Bologna (IT)

(72) Inventor: Paolo Tosato, Bologna (IT)

(73) Assignee: Datalogic IP Tech S.R.L., Bologna (IT)

( * ) Notice: Subject to any disclaimer, the term of this patent is extended or adjusted under 35 U.S.C. 154(b) by 305 days.

(21) Appl. No.: 15/764,857

(22) PCT Filed: Sep. 30, 2016

(86) PCT No.: PCT/IB2016/055868
§ 371 (c)(1),
(2) Date: Mar. 29, 2018

(87) PCT Pub. No.: WO2017/056051
PCT Pub. Date: Apr. 6, 2017

(65) Prior Publication Data
US 2018/0275256 A1 Sep. 27, 2018

(30) Foreign Application Priority Data
Oct. 1, 2015 (IT) .......................... UB2015A004113

(51) Int. Cl.
*G01C 3/08* (2006.01)
*G01S 7/487* (2006.01)
(Continued)

(52) U.S. Cl.
CPC ............ *G01S 7/4873* (2013.01); *G01S 7/487* (2013.01); *G01S 7/4861* (2013.01); *G01S 7/497* (2013.01); *G01S 17/04* (2020.01)

(58) Field of Classification Search
CPC ...... G01S 7/4873; G01S 17/04; G01S 7/4861; G01S 7/487; G01S 7/497
See application file for complete search history.

(56) References Cited

U.S. PATENT DOCUMENTS 5,789,740 A    8/1998  Ollhaeuser
6,307,622 B1 * 10/2001 Lewis .................. G01S 17/08
                                                       356/4.01
(Continued)

FOREIGN PATENT DOCUMENTS

DE    41 41 469       6/1993
DE    4141469 A1 *    6/1993  ............... G01V 8/12
(Continued)

OTHER PUBLICATIONS

International Search Report and Written Opinion regarding International Application No. PCT/IB2016/055868, dated Feb. 10, 2017.

*Primary Examiner* — Samantha K Abraham
(74) *Attorney, Agent, or Firm* — Foley & Lardner LLP

(57) ABSTRACT

The present invention relates to a method for receiving a pulsed signal emitted by an emitter (2,20) in an optoelectronic sensor (1), the sensor including at least an emitter (2,20) for emitting electromagnetic radiation and a receiver (3, 30) for receiving electromagnetic radiation and wherein the electromagnetic radiation received is converted into an electric signal, said method including the steps of: o arranging said emitter to emit a pulsed electromagnetic radiation; o before the emission of a pulse, receiving an electromagnetic radiation received through said receiver (3, 30) by generating a noise signal ($s_r$,S1,S2); o comparing an amplitude of said received noise signal ($s_r$,S1) with a first threshold ($V_{threshold}$); and o emitting said pulse if the amplitude of said received noise signal is below said first threshold, and not emitting said pulse otherwise. The invention also relates to an optoelectronic sensor.

21 Claims, 5 Drawing Sheets

(51) Int. Cl.
  *G01S 7/497* (2006.01)
  *G01S 17/04* (2020.01)
  *G01S 7/4861* (2020.01)

(56) References Cited

U.S. PATENT DOCUMENTS

| | | |
|---|---|---|
| 6,927,385 B2 | 8/2005 | Adamietz et al. |
| 8,050,570 B2 | 11/2011 | Schmitz et al. |
| 8,288,707 B2 | 10/2012 | Hauske et al. |
| 8,384,883 B2 | 2/2013 | Heizmann et al. |
| 2003/0010891 A1 | 1/2003 | Mizuhara et al. |
| 2010/0301193 A1* | 12/2010 | Guellec .................. G01S 17/89 250/208.1 |
| 2015/0022474 A1 | 1/2015 | Sossenheimer et al. |
| 2015/0078753 A1 | 3/2015 | Lung et al. |

FOREIGN PATENT DOCUMENTS

| | | | |
|---|---|---|---|
| DE | 198 33 353 | 2/2000 | |
| DE | 19833353 A1 * | 2/2000 | ............. G01S 17/04 |
| DE | 10 2005 018 263 A1 | 2/2006 | |
| WO | WO-2014/049544 A1 | 4/2014 | |

* cited by examiner

METHOD TO DETECT A SIGNAL AND OPTOELECTRONIC SENSOR

RELATED APPLICATIONS

This Application is a 371 National Stage Application of International Application No. PCT/IB2016/055868, filed Sep. 30, 2016, which claims priority to UB2015A004113 filed Oct. 1, 2015 in Italy, the contents of which are incorporated herein by reference in their entirety.

TECHNICAL FIELD

The present invention relates to an optoelectronic sensor and a signal detection system in that optoelectronic sensor.

TECHNOLOGY BACKGROUND

Optoelectronic sensors have been used for a long time in the industrial automation industry, in packaging machines or in the food industry for detecting the presence or a characteristic of an object. There are different types of optoelectronic sensors, each type being specialized in a specific application or for detecting a specific characteristic of an object positioned within a range of operating distances.

Optoelectronic sensors base their operation on the physical capabilities of photosensitive elements used to change their electric characteristics in relation to the light intensity of the light that hits them. The variation in the light intensity of the light source that invests the receiver element, conditioned by the presence or absence of the object to be detected, or its characteristics, causes the receiver to emit an electric signal. The optoelectronic sensor is not in physical contact with the object to be detected, which can be of any nature and distant from a few millimeters up to several meters.

A first type of optoelectronic sensor is defined with different terms, such as based on diffusion, direct reflection, diffuse or proximity sensor. According to this type, the emitter and receiver are in the same container, together with the electronic controls. The operation is based on the light reflected from any object placed in close proximity. The light beam is generated by the emitter and when reflected from an object, returns to the casing by raising the receiver.

A second type is called of the retro-reflection or reflection type. It works on the interruption of the light beam from the object and in this version, the light beam generated by the emitter is reflected by a prismatic reflector (has the characteristic of reflecting the incident light in parallel) towards the receiver. Also in this case the emitter and receiver are in the same container together with the control electronics.

The third type of optoelectronic sensors is called barrier and also works on the principle of interruption of the light beam. In this type, however, the emitter and receiver are separated in different containers, and then the light beam is conveyed from the emitter towards the receiver.

Regardless of the type, in an optoelectronic sensor there is therefore at least an emitter suitable for emitting an electromagnetic radiation and a receiver suitable for receiving the electromagnetic radiation, whether this is diffused, refracted or transmitted due to the emitted radiation. The emitted radiation generally includes a pulse or a pulse train having a relatively short duration compared to the period in which no electromagnetic radiation is transmitted. Receiving the pulse and subsequently processing it determines the detection of the characteristic of interest that is to say, for example, the lack of reception of one or more pulses determines the presence of an object between the emitter and detector.

However optoelectronic sensors are subject to detection errors, generically called hereafter "measurement errors", due to—among others—the fact that the electromagnetic radiation received by the receiver is not only due to the radiation emitted by the emitter, but also to radiation emitted by more electromagnetic radiation sources that are present in the environment in which the sensor is positioned. Lamps, the sun, reflecting mirrors, sources of electromagnetic radiation in general, etc., cause the receiver to reach a composite radiation caused by the sum of many different separate radiations due in part to the emitter, but also caused by the other sources present in the surrounding environment. The behavior of these additional sources, which in this context we shall call "noise," is the most diverse and is not predictable in advance.

A typical example of a further luminous radiation source modifying what has been received by the receiver with respect to the radiation emitted by the only emitter is the fluorescent lamp. These lamps emit a light that can be treated as a signal with a carrier at around 40-100 kHz and a modulation around 50 Hz. The light intensity emitted by these fluorescent lamps can be particularly intense and in the peak instants it may cause the receiver to be in a non-optimal detection range. Still, another popular example of light source that creates noise is the "flash" lamp, which, as the name says, emits, in an unpredictable way in time, intense light emissions that lead to the saturation of the receiver. Such lamps are, for example, the flash located in forklift trucks in industrial plants.

These and other sources of light radiation create a noise radiation that is detected by the receiver. The radiation that reaches the receiver is therefore not always convertible into a "useful" signal, or is not always convertible into a signal that actually represents the detection or not of an object. Radiation that reaches the receiver with a higher intensity than a certain threshold is "unreceivable", that is to say the electronics in this receiver is not able to correctly process the electric signal resulting from it. In case where, while there is such a high noise signal received in the receiver, a pulse is also emitted by the emitter, this pulse does not lead to any possible measurement and the total signal caused by to the sum of radiation due to noise and that due to the emitter must be discarded. However the presence of numerous signals being received and considered as errors lengthens the time needed to make a correct measurement or can lead to a false detection. As the time between two pulses emitted by the emitter is relatively long, and similarly long is the time between two received signals, if many of these are to be discarded, the time needed to get a desired number of useful signals to obtain the desired measurement increases considerably, for example by slowing down the production operations, if the sensor is located in an industrial line. A solution to this problem might be to increase the number of emitted pulses, or to increase their frequency by decreasing the time elapsed between one pulse and the next. However in commercial devices, excessively increasing the frequency of pulses can cause the emitters and the electronics associated with them to overheat. Excessively increasing the number of pulses per unit of time is therefore not a viable solution.

SUMMARY OF THE INVENTION

The present invention relates to an optoelectronic sensor and to a method of receiving the pulses emitted by an emitter in an optoelectronic sensor in which the problems mentioned with reference to the prior art are remedied at least partially.

In particular the invention makes a method and an optoelectronic sensor available, in which, in the reception phase in the presence of noise, the number of "useful" received signals is possibly greater than in the known sensors, without increasing the frequency of the number of pulses emitted by the emitter.

According to a first aspect, the invention relates to a method for receiving a pulsed electromagnetic radiation emitted by an emitter in an optoelectronic sensor, the sensor including at least one emitter to emit electromagnetic radiation and a receiver to receive electromagnetic radiation and in which the electromagnetic radiation received is converted into an electric signal, said method including the steps of:
 arranging said emitter to emit a pulsed electromagnetic radiation;
 before the emission of a pulse, receiving an electromagnetic radiation received through said receiver by generating a noise signal;
 comparing an amplitude of said received noise signal with a first threshold; and
 emitting said pulse if the amplitude of said received noise signal is below said first threshold, and not emitting said pulse otherwise.

In a second aspect, the invention relates to an optoelectronic sensor including:
 an emitter arranged for emitting a pulsed electromagnetic radiation;
 a receiver arranged for receiving an electromagnetic radiation and converting it into an electric signal and including a first circuit detecting a noise signal corresponding to an electromagnetic radiation received before the emission of said pulse;
 a first comparator arranged for comparing an amplitude of said noise signal with a first threshold; and
 an actuator circuit configured to control the emitter so as to enable the emission of a pulse only if the amplitude of said noise signal is below said first threshold and not to enable the emission otherwise.

The optoelectronic sensor of the invention is any type of optoelectronic sensor suitable for detecting objects or characteristics of objects. It can be for example a diffusion sensor, where the sensor responds to any object that reflects light; a retroreflection sensor, where the sensor only responds to light reflected from a well determined surface called reflector; or a through-beam sensor, where the sensor responds to any interruption of the light flux.

Preferably, the optoelectronic sensor of the invention is a synchronous sensor, or a sensor in which the emitter and receiver are electronically connected to each other and between them there is a possible synchronization within the same circuit so that the receiver always "knows" when a pulse is emitted by the emitter. However, the invention is also applicable to optoelectronic sensors in which the receiver and emitter are disconnected from each other and for example positioned so spatially spaced apart from one another, provided that there is a transmission of information between the receiver and emitter relating to the instant of the pulse emission by the emitter.

The emitter can be of any type, for example including a solid state polychromatic device (non coherent emission). Alternatively, it may include a laser. Preferably, the emitter includes an LED (Light Emitting Diode), for example with emission in the visible, infrared or ultraviolet band. The emitter is suitable for emitting a pulsed electromagnetic radiation. Pulsed radiation means that the emission of the emitter is an electromagnetic radiation different from zero for a "short" time interval $T_{on}$ and equal to zero otherwise. During the time interval $T_{on}$ a plurality of pulses may also be present, or a pulse train of total duration $T_{on}$ may be sent by the emitter. The electromagnetic radiation emitted by the emitter could also be a periodic radiation of period T, in an interval equal to $T_{off}$ between two distinct pulses.

The receiver preferably comprises a photodetector such as photodiodes or photoresistors, sensitive devices to a very broad spectrum of frequencies. The receiver is capable of transforming electromagnetic radiation into an electric signal. Therefore, upon its detection, the received electromagnetic radiation is transformed into an electric signal that is then conveniently processed as indicated hereinafter. In other words, a photodetector converts a light signal into an electric signal, typically into a current. There are photodetectors that use different physical principles. Preferably, a photodiode is used. The receiver is synchronized with the emitter, which means that it contains the information of the time in which the pulses are emitted by the emitter.

So as to detect an object or a characteristic of it, an optoelectronic sensor detects, when the luminous radiation is emitted by the emitter, the electromagnetic radiation corresponding to the emission and, from an analysis of it, is able to establish the presence or not of an object or data of one of its characteristic. For example, in a light barrier, the absence of reception by the receiver of a pulse emitted by the emitter may signify the presence of an object. However, not only the emitter emits luminous radiation, but also numerous other sources arranged in the vicinity of the sensor, which generate a noise radiation which, when detected by the receiver, in turn generates a noise signal.

According to the invention, an assessment is performed of this noise, before emitting the pulse and preferably before the emission of each pulse by the emitter in case a periodic pulse is emitted. Therefore, preferably the method of the invention is executed every time a pulse is to be emitted, and more preferably the method is repeated at least with period T.

In order to monitor the level of noise radiation, the receiver performs a first reception even outside the range of time in which the emitter emits a signal, that is to say the receiver receives radiation which is processed not only when the emitter emits the pulse, but also when there is no radiation emitted by the emitter.

Therefore, before a pulse is emitted, or during the time of absence of emission by the emitter, the receiver receives electromagnetic radiation that is derived exclusively from sources different from the emitter, which are the sources that cause noise. The signal obtained from the reception of this radiation is therefore a noise signal only. This radiation that generates the noise signal is preferably detected immediately before the emission of the pulse, immediately before meaning that in the receiving circuit there must be enough time for these phases to be carried out. In other words, there is a time interval needed for the electronic circuitry to receive, optionally amplify and thus compare electromagnetic radiation with a first threshold and then, depending on the result of the comparison, to emit or not the pulse. Each of these operations takes time within the receiver circuits that depend on the structure used. The fastest structures are analogical, while the digital ones generally take a longer time even if optimized for these types of operations. Depending on the circuit used, therefore, the time required is known to make the above operations, called "decision time". This time interval terminates at the instant of emission of a pulse or immediately at the beginning of the delay of the pulse itself, as detailed below.

This noise signal is compared with a first threshold, for example by means of a first comparator. If the signal amplitude does not exceed the first threshold, then the pulse is emitted at the correct time by the emitter: if the decision to emit a pulse at time T* was set, it is emitted at T*. In case of periodic emission of period T, at the end of period T, the pulse is preferably emitted, that is to say that the frequency of the electromagnetic radiation emitted by the emitter is not altered.

The comparison of the amplitude of the noise signal with this first threshold substantially determines the amplitude of the noise present. If the amplitude of the noise present is sufficiently "low" or is below the first threshold that has been set, this means that when the pulse is emitted by the emitter, the receiver is able to detect the difference between the situation before the emission and that after the emission, and therefore, can acquire reliable data—not considering at this time other possible sources of error—for the determination of the measurement to be made through the optoelectronic sensor. In this situation of acceptable noise level, which is below the first threshold, the pulse is emitted at the instant established by the logic of the emitter, which is at T*. In the event of a periodic signal, two consecutive pulses j and j+1 are spaced by a time $T_{off}$ in other words the pulse is emitted when period T expires.

Alternatively, in the case in which the noise signal is unduly high, or its amplitude is greater than the first threshold, then the pulse is not emitted by the emitter. In other words, the pulse is "blocked", that is no longer emitted at T* or, in the case of a periodic signal, is not emitted even if a time equal to the first time interval, $T_{off}$, has expired, and according to the logic of the emitter the latter should emit a pulse. The pulse emission block ensures that energy is not wasted in the emission of a pulse that cannot be detected, or the detection of which does not lead to any useful data. If the noise signal is so high that its amplitude exceeds the first threshold, it may mean that noise is so high as to exceed the maximum intensity threshold, for example, which that it is receivable by the receiver, which has an optimum operating range. The emission of a pulse by the emitter in these noise conditions does not allow any results to be obtained since the noise signal covers or has a higher intensity than the pulse itself. Therefore, a signal detected in these conditions, depending on the logic used in the receiver, would either lead to a false positive (or the detection of an object when not present, for example), or to a false negative. According to the invention a pulse is not emitted when this would not lead to a benefit for the measurement made. Always according to the invention, a pulse is emitted exclusively when it could be "useful", which means it could give an indication such as the presence or absence of an object or of one of its characteristics, without it being masked by excessive noise.

For example, in case near the sensor there is a fluorescent lamp generating a substantially periodic signal, but of a much greater period than the emission of the radiation by the emitter, there will be intervals of time in which the noise signal is below the first threshold, and thus it is possible to emit the pulse, whereas there will be time intervals in which the amplitude of the noise signal caused by the fluorescent lamp is so high that the first threshold is exceeded. In these cases, the pulse is not emitted. Substantially according to the invention, in a situation in which a fluorescent lamp is present as a noise element, the disturbance of the fluorescent lamp is sampled and the pulse is emitted as soon as the noise is below a certain first set threshold.

Similarly, in the case for example of a flash, produced by a lamp, it is known that it creates a saturation condition in the receiver that can also cause a reversal. During saturation, the pulses that might be emitted by the emitter cannot constitute a useful signal for the purposes of the measurement as the amplitude of the noise signal is so high that already by itself it "blinds" the receiver, a further amplitude of the noise added to the noise would simply blind the receiver even more without providing any useful information on the presence or absence of objects or their characteristics. Failure to send any pulses while the receiver is located in the saturation phase saves energy to the emitter.

Preferably, the method of the invention includes the step of arranging said emitter so to emit a periodic pulsed electromagnetic radiation, two consecutive pulses being spaced apart by a first time interval.

Advantageously, said emitter is suitable for emitting a periodic electromagnetic radiation at pulses spaced apart from one another by a first time interval.

A periodic pulsed radiation in this context means that the emitted electromagnetic radiation has a period T and in this period T the radiation has an amplitude different from zero for a time $T_{on}$ and equal to zero for a time $T_{off}$, in which $T_{on}+T_{off}=T.=T$. Preferably $T_{off}>T_{on}$, more preferably $T_{off}>>T_{on}$. Advantageously $10<T_{off}/T_{on}<100$. This noise signal is compared with a first threshold, for example by means of a first comparator. If the amplitude of the signal does not exceed the first threshold, then the pulse is emitted at the correct time by the emitter, at the end of period T, which means that the frequency of the electromagnetic radiation emitted by the emitter is not altered. In case of a pulse train emitted in each period T, the time $T_{on}$ represents the duration of the entire pulse train. Between one pulse and the other of the same train, there will still be sub intervals of time in which the emitted signal has a "low" amplitude or substantially equal to zero.

Preferably, in the method of the invention, not emitting said pulse comprises the step of, in the case in which the amplitude of said received noise signal is above the first threshold, delaying the emission of the pulse by a second time interval after the first time interval has elapsed.

Preferably, the optoelectronic sensor of the invention, more preferably the receiver, includes a delay circuit, suitable for controlling said emitter and for delaying the emission of the pulse after the expiration of said first time interval by a second time interval in case where the amplitude of said received noise signal is above the first threshold.

More preferably, in case of a periodic signal where two consecutive pulses are spaced one from the other by a first time interval, the second time interval is less than the first time interval. For a noise generated by fluorescent lamps, it was found that it is preferable to maintain the second time interval below the maximum possible frequency of the noise of the fluorescent lamp, which is estimated at approximately 10 microseconds and is thus independent from the first time but closely related to the maximum frequency of the noise. In the case of noise resulting from flash, it was found that it is preferable to have a second time interval below the first time interval. In typical applications the first condition mentioned is more stringent than the second.

In the case where the pulse is not emitted, because the noise present is too high, it is not canceled, but "delayed" by a certain time equal to a second time interval $T_2$. This means that, if the noise is greater than the first threshold, the pulse is not emitted at T*, but a new standby interval is set, that is to say that the emission of the pulse at a time $T^*+T_2$ is "retried". In case of a periodic signal, this second time interval is added to $T_{off}$ so that the new $T_{off}$ interposed between pulses j (emitted) and j+1 (to be emitted) becomes $T_{off}=T_{off}+T_2$. Substantially, the addition of a second time interval delaying the pulse emission may be regarded as a variation of the time interval elapsed between two consecutive separate pulses j and j+1, here called the first time interval or $T_{off}$. Adding this second time interval delays the emission of the pulse substantially waiting for a noise signal situation that is more favorable to the execution of a correct measurement. More preferably, this second time interval $T_2$ is smaller than the time $T_{off}$ (first time interval). In fact, generally the first time interval between two pulses is relatively long and waiting, every time that, at the time of the emission of a pulse, this is not emitted because the noise signal is above the first threshold, a complete first time interval $T_{off}$ before making a new emission and therefore a new measurement might affect the productivity of the sensor. Therefore, the waiting time interval, equal to $T_2$, before retrying to send the pulse is shorter than a $T_{off}$ so as to improve the performance of sensor.

Basically, preferably the emission of the pulse by the emitter is delayed until the receiver is ready to operate again correctly, which means that the emission is delayed until there is a better condition of noise, and when this is found—the noise signal amplitude returns to be below the threshold—the pulse is emitted.

Advantageously, the method according to the invention includes, after the step of delaying the emission of said pulse, the step of: subsequently to said second time interval expiring and before the emission of the pulse, repeating the steps of receiving an electromagnetic radiation through said receiver by generating a noise signal; comparing an amplitude of said received noise signal with a first threshold; and delaying the emission of the pulse by a second time interval, a number n of times so as to emit said pulse when the amplitude of the noise signal received prior to its emission is below the first threshold.

In case the radiation emitted was scheduled at a time $T^*$, it can be delayed by a time $T_{delay}=T^*+n\times T_2$ where n is an integer≥1. In case where the pulse emitted is a periodic signal, the j-th pulse is temporally spaced apart from the previous pulse j−1 by a time equal to the first time interval+ n×(second time interval).

Preferably, the noise signal is continuously sampled, more preferably with a period given by the time interval $T_2$, and compared with the first threshold. The pulse is constantly postponed by a multiple of time intervals each equal to $T_2$, until the receiver is in a situation where it receives a radiation (outside the emission) in which the amplitude of the corresponding noise signal has fallen below the first threshold, therefore being considered an "acceptable" noise, which is a condition in which the pulse is emitted by the emitter. The operation carried out is therefore comparable to that, in the case of periodic signals, of varying $T_{off}$ between two consecutive separate pulses j and j+1 emitted by the emitter according to the trend of the noise signal, and the new $T_{off}$ is equal to $T_{off}=T_{off}+n\times T_2$ where n=0, 1, 2, . . . etc.

This change of $T_{off}$ on the one hand can save the number of pulses emitted when they would not be effective because they do not lead to a reliable measurement and, on the other, allows the measurement process itself not to be slowed down excessively while waiting for a new $T_{off}$ after each non-emission. The noise signal is sampled and compared at short intervals, i.e. every $T_2$ (second time interval).

The sampling of the noise signal and its continuous comparison can be made either by an analog circuit, for example a "sample and hold" circuit, which maintains for example, via a capacitor, the value of the noise signal before the pulse emission, and this value is compared by means of a suitable logic with the first threshold, or by a digital circuit in which the data of the noise signal before the emission of the pulse is stored and compared with a first digital threshold.

In a preferred example, the method according to the invention includes: comparing an amplitude of said received signal with a first threshold during a third time interval directly preceding the emission of said pulse.

To get the highest possible chance of knowing the situation of the noise signal when the pulse emission occurs, it is preferable to measure the noise signal just before the pulse is emitted, considering that this noise signal should not undergo major variations in the pulse emission time, which is of relatively short duration. Therefore the measurement of the noise signal, i.e. its comparison, is carried out as close as possible to the end of the interval $T_{off}$ or the scheduled instant of emission $T^*$, during a third time interval that ends at the end of $T_{off}$ or $T^*$. This time interval is preferably the decision time necessary for the electronics to make the measurements and the processing of the signals necessary to make comparisons and to establish or not the emission of the signal. This third time interval therefore depends strongly on the type of electronics used.

Preferably, the method includes the steps listed, if said noise signal is below said first threshold:
  emitting said pulse;
  receiving an electromagnetic radiation in the first time
    interval in correspondence with the emission of said
    pulse so as to generate a measurement signal; and
  comparing an amplitude of said measurement signal
    received in correspondence with the emission of said
    pulse with a second threshold.

Preferably, the receiver includes a second circuit detecting a measurement signal corresponding to an electromagnetic radiation received during the emission of said pulse; and said receiver including a second comparator suitable for comparing an amplitude of said measurement signal with a second threshold.

While the pulse is emitted, which is a phase that occurs only if the amplitude of the sampled noise signal has fallen below the first threshold, the receiver receives electromagnetic radiation that is converted into an electric signal that is useful for the measurement, i.e. for example the presence or absence of an object, in a subsequent processing of the sensor. The amplitude of this measurement signal is compared, for example by means of a second comparator, with a second threshold, e.g. to verify the detection or not of an object.

More preferably, the step of comparing an amplitude of said received measurement signal in correspondence with the emission of said pulse with a second threshold comprises comparing an amplitude of said received measurement signal with a second threshold given by the sum of an amplitude of said received noise signal before the emission of said pulse and a constant value.

Preferably, said second threshold is given by the sum of an amplitude of said noise signal received prior to the emission of said pulse and a constant.

Comparing the received measurement signal with a threshold is part of the normal method of operating an optoelectronic sensor to detect the presence or absence of an object or of one of its characteristics. However, in the sensor of the invention, this threshold, called second threshold, is variable and depends on the amplitude of the noise present, the noise preferably present just before the emission of the pulse. In fact, any amplitude value of the measurement signal that was below the amplitude value of the noise signal would lead to an unusable measurement, as it could indicate either a false positive or a false negative according to the logic used. Therefore, in this way, with a variable threshold that depends on the noise signal, the possible errors are minimized.

Alternatively, the method of the invention includes the steps of:
  subtracting an amplitude of said received measurement signal, in correspondence with the emission of said pulse with an amplitude of said received measurement signal;
  comparing the difference with a second constant threshold.

Advantageously, in the sensor of the invention, said second threshold is a constant, and the sensor includes an adder for subtracting a signal received after the emission of a pulse of said noise signal and a second comparator suitable for comparing the difference with said second threshold.

This second example is preferred in the case of a digital logic. A first noise signal S1 is preferably measured just at the beginning of the time interval, called the third time, in which an evaluation is made by the electronic circuitry about whether it is appropriate or not for the emitter to emit a pulse. This first noise signal is compared with the first threshold. In the case in which the noise signal is sufficiently low, a new noise measurement S2 is carried out immediately before the emission of the pulse. The pulse is then emitted and the signal S3 received during the emission of the pulse is measured. The comparison with a second threshold, this time constant and no longer dependent on noise, is made with a differential value of S3−S2.

Advantageously, the method according to the invention includes, before the step of comparing an amplitude of said received electromagnetic noise signal with a first threshold or prior to the step of comparing an amplitude of said received measurement signal with a second threshold, the step of amplifying said received noise signal or amplifying said measurement signal.

Advantageously, said receiver includes an amplifier stage for amplifying said noise or measurement signal, and said first or second comparator being positioned downstream of said amplifier stage.

The electromagnetic emission received and converted by the photodetector into an electric signal is then amplified so as to become a more easily processable signal.

Preferably, the method includes: converting said received analog signal into a digital signal.

Preferably, the sensor includes an analog/digital converter suitable for converting said noise or measurement signal into a digital signal.

The analog to digital converter can convert the analog signal—whether a measurement or noise signal—immediately after amplification, or downstream of the amplification the signal is converted to digital, and therefore the comparison with the first and/or the second threshold is done digitally; or the A/D converter can be present at the end of the comparison with the first and with the second threshold, depending on the type of circuit realized. In the case of optoelectronic sensor including an ASIC (Application-Specific Integrated Circuit), preferably the A/D converter is immediately downstream of the amplification stage.

Preferably, said first threshold is dependent on the maximum amplitude of said pulse, and/or on said third time interval and/or the second threshold and/or on the first time interval.

DESCRIPTION OF THE DRAWINGS

These and additional advantages of the invention will become more evident from a detailed description with reference to the enclosed drawings, where.

DESCRIPTION OF A DETAILED EXAMPLE OF EMBODIMENT

Figure 1:
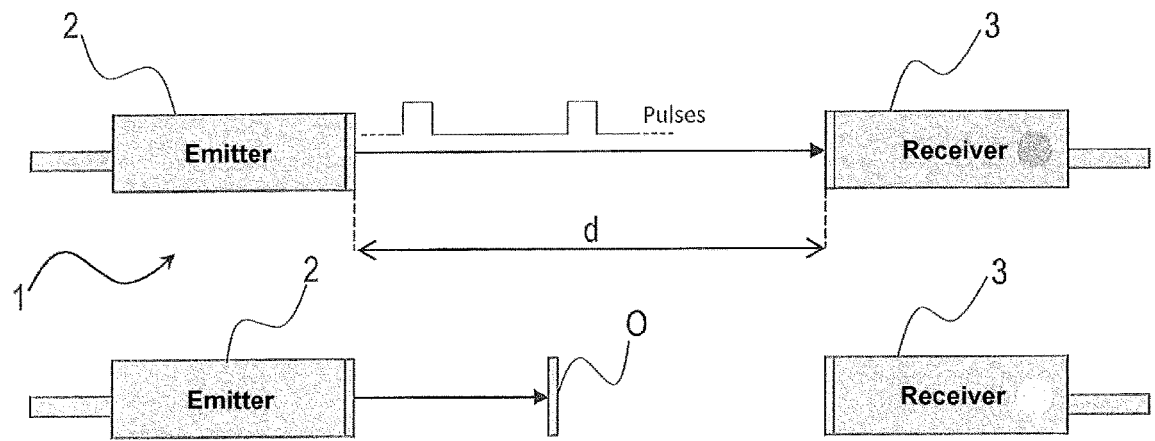
FIG. 1 shows a diagram of an optoelectronic sensor according to the invention.

On FIG. 1, an optoelectronic sensor suitable for identifying an object O, its distance or one of its characteristics is globally indicated with 1.

Figure 4:
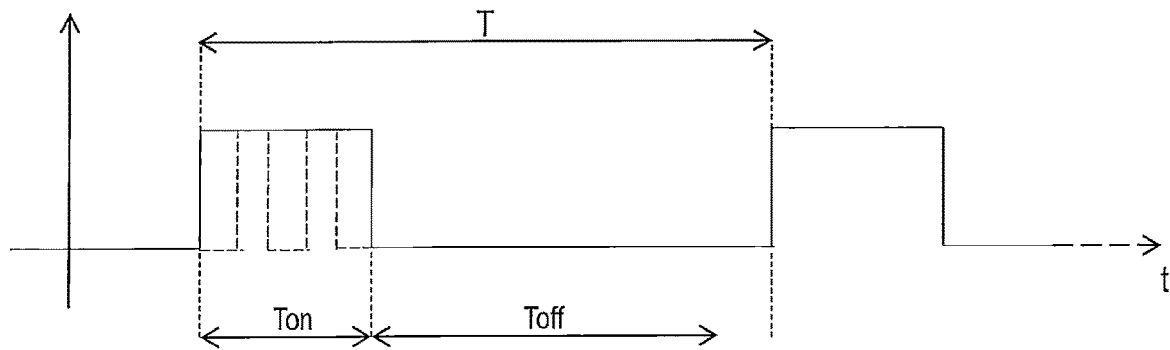
FIG. 4 shows the mode of emission of the emitter of an optoelectronic sensor of a known type.

The sensor 1 includes an emitter 2 and a receiver 3 spatially spaced apart by a distance d. The emitter 1 is configured so as to emit a pulse train in a total time $T_{on}$, including two pulses, as shown in FIG. 4 (better detailed later). The pulse train is repeated with period T where $T \gg T_{on}$.

Although in the example detailed reference is made to a synchronous optoelectronic sensor, that is to say a sensor in which the emitter and receiver are electrically connected to each other and between them there is a possible synchronization within the same circuit so that the receiver always "knows" when a pulse is emitted by the emitter, the invention is also applicable to optoelectronic sensors of non-synchronous type.

The sensor 1 is arranged for determining the presence of the object O, one of its position or of one of its characteristics in the following manner, as schematically represented in FIG. 1: in the absence of object O between emitter 2 and receiver 3, the pulse train in its entirety reaches the receiver 3, while in the case of the interposition of the object O, the transmission of pulses between emitter 2 and receiver 3 is interrupted. The detection is performed as follows.

Figure 2:
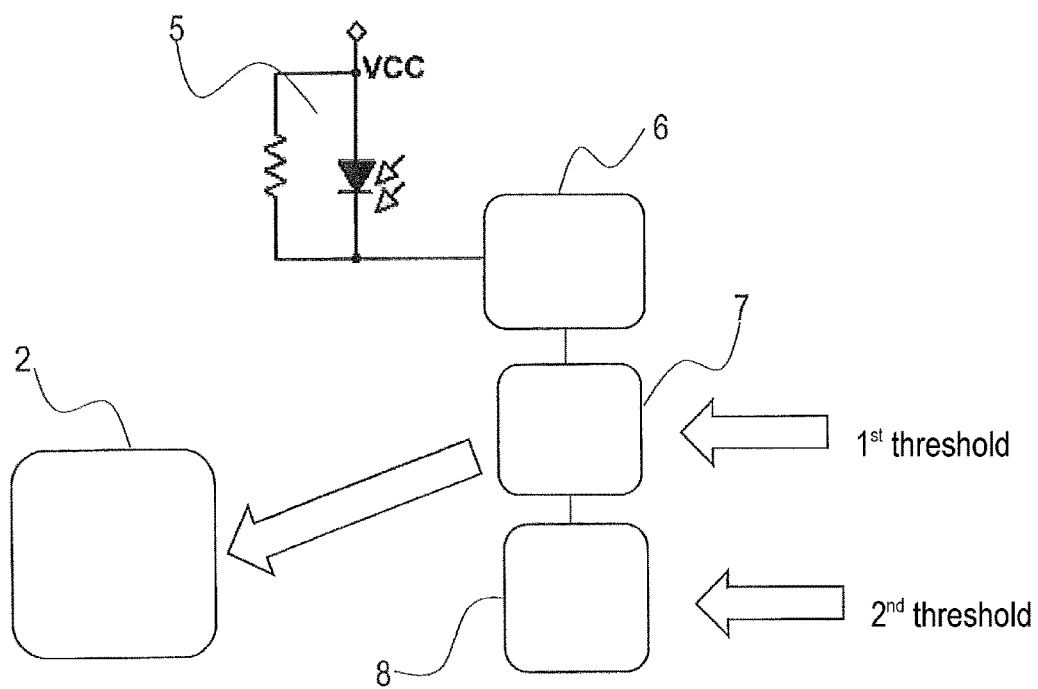
FIG. 2 shows a block diagram of a sensor circuit of FIG. 1.

With reference to FIG. 2, the receiver 3 includes a photodiode 5 suitable for converting the electromagnetic radiation received into an electric signal. The electric signal emitted by the photodiode 5 is then optionally amplified by an amplification stage 6 positioned downstream of the photodiode.

The receiver 3 also includes a first measurement circuit, including photodiode and amplifier, arranged for receiving a first signal corresponding to an electromagnetic radiation received by the photodiode 5 when no signal is emitted by the emitter, and then corresponding to a noise signal, and a second measurement circuit suitable for receiving a second signal corresponding to an electromagnetic radiation received by the photodiode 5 when a pulse is emitted by the emitter 2, and therefore corresponding to a real measurement signal. The first and the second circuit are preferably the same circuit, including photodiode 5 and amplifier 6, simply operating in different operating situations. The receiver 3 also includes a first comparator 7 arranged for receiving as input the noise signal and comparing the first noise signal with a first threshold. The first comparator is arranged for sending a signal to the emitter so as to control the same according to the result of the first comparison. Additionally, downstream of the first comparator, the receiver 3 includes a second comparator 8 arranged for receiving as input the measurement signal and comparing the measurement signal with a second threshold.

The operation of the receiver 3 is the following. A signal is detected by the photodiode 5 and amplified by the amplifier 6, considered as the first detection circuit when there is no emission by the emitter, but there is a next scheduled emission at time T*. The amplified signal, only noise signal, is compared by the first comparator 7 with a first threshold. The first comparator can emit two types of output signals. A first signal enables the emission of the pulse scheduled at time T* if the noise signal is below the first threshold, and a second signal of "block" of the emission of the signal in case this is above the first threshold. This evaluation is made in a decision time interval called the third time interval that depends on the electronics used. In this second case a delay, that is a waiting time for the pulse emission, is imposed. Before being emitted by the emitter the pulse must therefore meet the following conditions:

the noise signal must be below the first threshold; and a time equal to n delay times with n≥1 must have elapsed.

In case the noise signal is below the first threshold, the emitter emits the pulse. The photodiode 5 and the amplifier 6 in this case functioning as a second detection circuit now, during the emission of the pulse, detect a signal that depends on both the pulse and the noise. This signal of actual measurement is compared with a second threshold that is related to the logic of detection or not of an object. The comparison result is related to the output of the sensor itself.

With reference now to FIGS. 3 to 7, a preferred example of the optoelectronic sensor according to the present invention is globally indicated with 10.

The sensor 10 comprises an emitter 20, suitable for emitting a periodic pulsed electromagnetic radiation (or pulse train) $s_i$, a receiver 30, suitable for receiving the electromagnetic radiation $s_i$ emitted by the emitter 20 and converting it into an electric signal, and an actuator circuit 40. In the following description, reference will be made to a periodic pulsed electromagnetic radiation, but it is understood that the same applies in the case of periodic electromagnetic radiation with pulse train.

Figure 5:
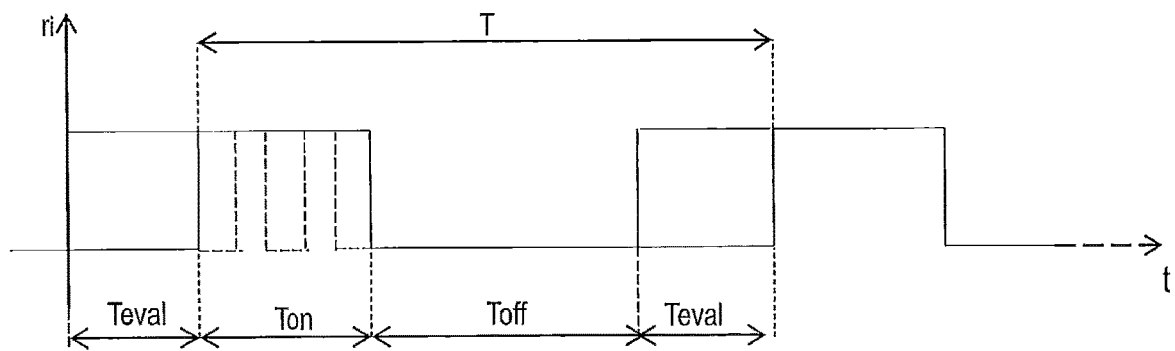
FIG. 5 shows the mode of emission of the emitter of the optoelectronic sensor of FIG. 3, in the event of positive outcome of the comparison between the amplitude of the received noise signal and a first threshold.

More particularly, and with reference to FIGS. 4 and 5, the periodic pulsed electromagnetic radiation emitted by the emitter 20 to pulse has a period T given by the sum of a time interval $T_{on}$, during which the emitter 20 emits and the receiver 30 receives, and a time interval $T_{off}$, preferably greater than the time $T_{on}$, during which the emission both the emission and the reception of the optoelectronic sensor 10 are disabled.

The emitter 20 comprises an LED (Light Emitting Diode) 22, arranged for emitting periodic pulsed electromagnetic radiation $r_i$. The receiver 30 includes a photodiode 32 arranged for detecting a noise signal $s_r$ generated, and a measurement signal $s_m$ and therefore defining a first and a second detector circuit depending on the operating mode of measurement. More particularly, the noise signal $s_r$ corresponds to an electromagnetic radiation received in correspondence of an evaluation time $T_{eval}$ before time $T_{on}$ of pulse emission by the emitter 20, whilst the measurement signal $s_m$ corresponds to an electromagnetic radiation received during the emission of the pulse by the emitter 20.

Downstream of the photodiode 32, the receiver 30 comprises an amplifier stage 34, arranged for amplifying the noise signal $s_r$ and/or the measurement signal $s_m$.

Located downstream of the amplifier stage 34, the receiver 30 comprises a first comparator 36 arranged for comparing the amplitude of the noise signal $s_r$ received at time $T_{eval}$ with a first threshold $V_{threshold1}$. If the amplitude of the noise $s_r$ does not exceed the first threshold $V_{threshold1}$, then the actuator circuit 40 controls the emitter 20 so as to enable the emission of a pulse at the end of the period $T_{off}$. The frequency of emission of the emitter 20 is consequently not altered. Otherwise, if the amplitude of the noise signal $s_r$ exceeds the first threshold $V_{threshold1}$, then the circuit 40 controls the actuator 20 so that the emitter does not emit any pulse. In other words, the pulse is "locked" even if a time $T_{off}$ has elapsed and, according to the logic of the emitter 20, the latter should emit a pulse. This allows, advantageously, the saving of the energy associated with the emission of a pulse which, because of the high noise, would not be detected by receiver 30.

In a preferred embodiment, in the case where the amplitude of the noise signal $s_r$ exceeds the first threshold $V_{threshold1}$, the pulse emitter 20 is not deleted, but preferably "delayed" by a time interval $T_{retry}$ (see FIG. 6), which is added to $T_{off}$. Preferably $T_{retry}$ is smaller than $T_{off}$. To this end, the optoelectronic sensor 10, more preferably the receiver 30, includes a delay circuit not shown in FIG. 3, arranged for controlling the emitter 20 so that this delays by the time interval $T_{retry}$ the emission of the pulse when the time interval $T_{off}$ expires. A variation of elapsed time between two consecutive separate pulses is obtained. This delay in emitting the pulse is used to wait for a more favorable noise signal for the execution of a correct measurement.

Between the amplifier stage 34 and the first comparator 36, the emitter 30 provides a "sample and hold" circuit 35 arranged for constantly sampling the noise signal $s_r$ before this is compared with the first threshold $V_{threshold1}$. Preferably, the noise signal $s_r$ is sampled by the "sample-and-hold circuit" 35 with a period equal to the time interval $T_{retry}$. Through a capacitor 37, the sampler 35 keeps the value of the noise signal before the emission pulse, and this value is compared with the first threshold $V_{threshold1}$. As an alternative to the analog "sample and hold" circuit, sampling can be performed by a digital circuit, in which the data of the noise signal before the emission of the pulse is stored and compared with a first digital threshold.

Preferably, the receiver 30 includes a second comparator 31 suitable for comparing the measurement signal $s_m$, suitably amplified by the amplifier stage 34, with a second threshold $V_{threshold2}$ given by the sum of the amplitude of the noise $s_r$ received at time $T_{eval}$ and a constant K, equal to the detection threshold in the absence of noise.

FIG. 5 shows a case in which, as a result of the comparison at time $T_{eval}$, comparator 36 detects that the noise signal $s_r$ to receiver 30 does not exceed the first threshold $V_{threshold1}$. The receiver 30 is therefore able to detect the difference between the situation before the emission and that after the emission, and therefore can acquire reliable data. In this case the actuator circuit 40 controls the emitter 20 and the emitter 20 emits, at time $T_{on}$, a pulse, which is detected by receiver 30.

Figure 6:
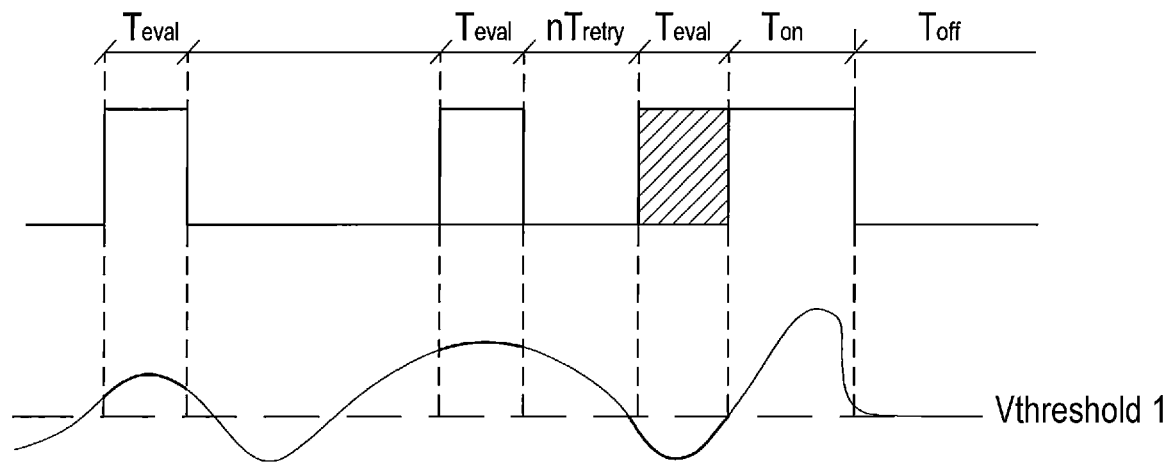
FIG. 6 shows the mode of emission of the emitter of the optoelectronic sensor of FIG. 3, in the event of negative outcome of the comparison between the amplitude of the received noise signal and a first threshold.

FIG. 6 shows a case in which, as a result of the comparison at time $T_{eval}$, comparator 36 detects that the noise signal $s_r$ to receiver 30 does not exceed the first threshold $V_{threshold1}$. As a result the noise signal is so high that it exceeds the maximum intensity threshold that receiver 30 can receive. In this case, the emission of emitter 20 is delayed by a time interval $T_{retry}$, after which a new comparison in a time $T_{eval}$ is performed. This step is repeated until the comparator 36 detects that the noise signal s, to receiver 30 does not exceed the first threshold $V_{threshold1}$ (hatched area in FIG. 6). At this point the receiver 30 is able to detect the difference between the situation before the emission and that after the emission, and therefore can acquire reliable data. The actuator circuit 40 may then operate to emit, at time $T_{on}$, a pulse, which is detected by receiver 30.

Figure 3:
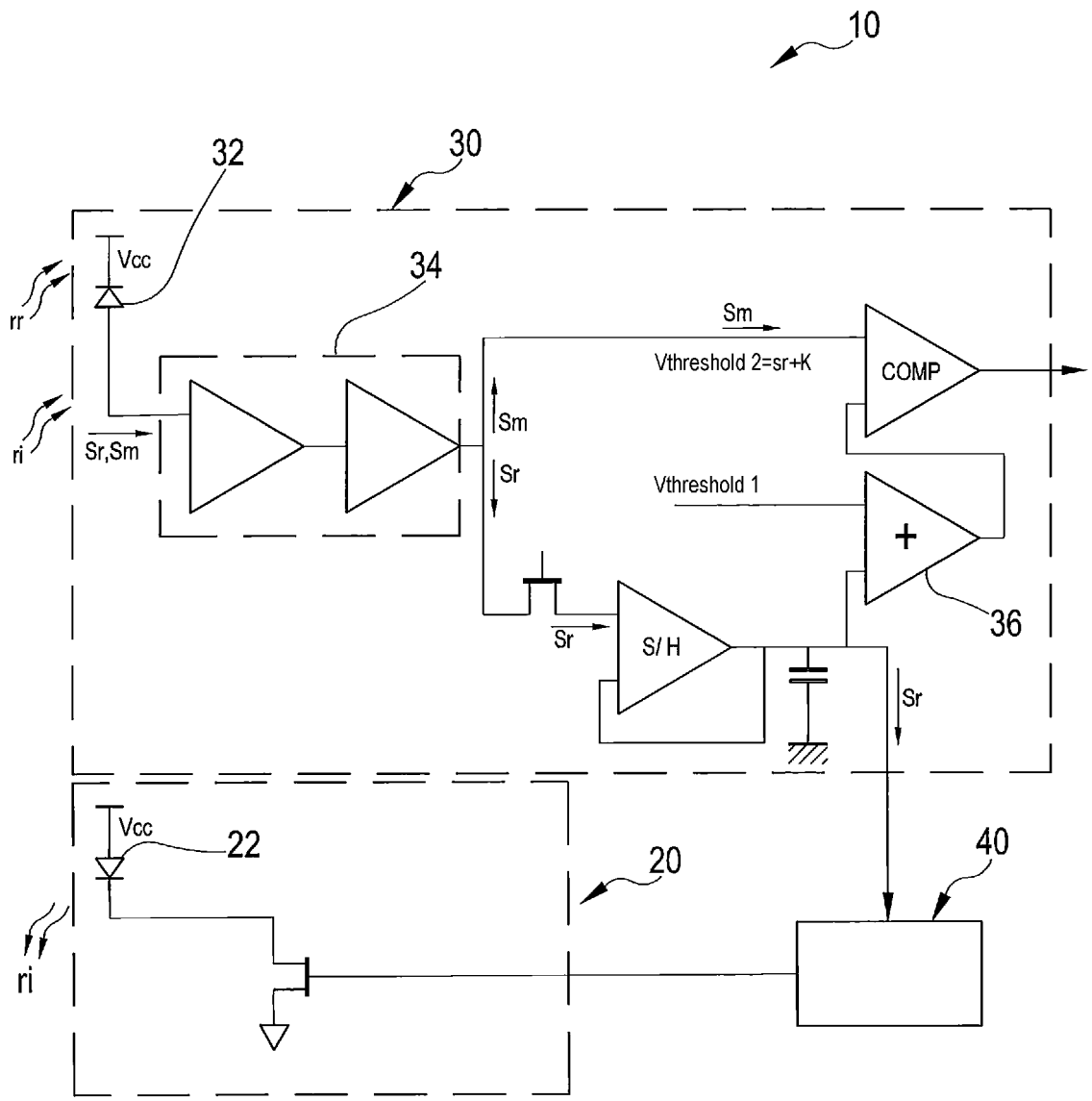
FIG. 3 shows the circuit diagram of an optoelectronic sensor according to the invention.
Figure 7:
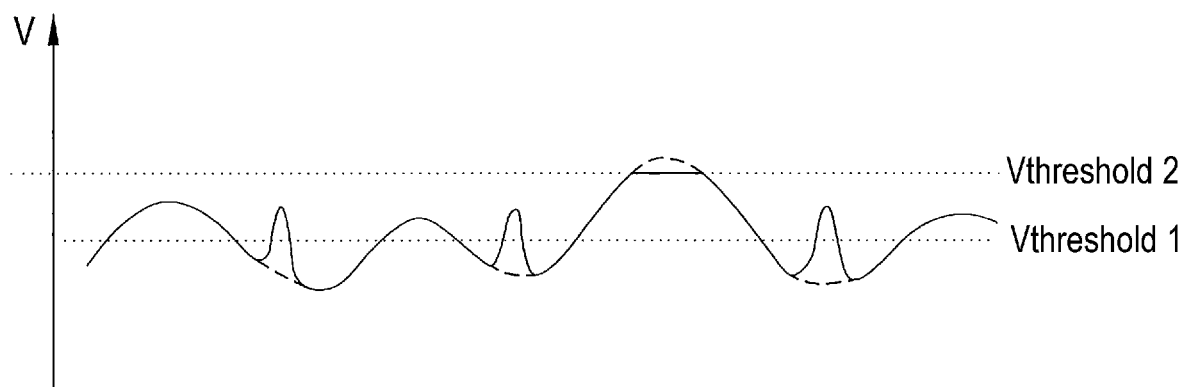
FIG. 7 shows the trend of the electric signal generated by the sensor receiver of FIG. 3 in the presence of noise produced by a fluorescent lamp.

FIG. 7 shows the emission mode of the optoelectronic sensor 10 of FIG. 3 in case, close to the sensor 10, there is a fluorescent lamp which generates a substantially periodic signal, but of a much greater period of the emission period of the radiation on the part of the emitter. As shown, there are time intervals in which the noise signal is below the first threshold $V_{threshold1}$, and therefore it is possible to emit the pulse, while there will be intervals of time wherein the amplitude of the noise signal due to the fluorescent lamp is so high that the first threshold is exceeded. In these cases, the pulse is not emitted. Substantially according to the invention, in a situation in which a fluorescent lamp is present as a noise element, the disturbance of the fluorescent lamp is sampled and the pulse is emitted as soon as the noise is below a certain first set threshold.

Figure 8:
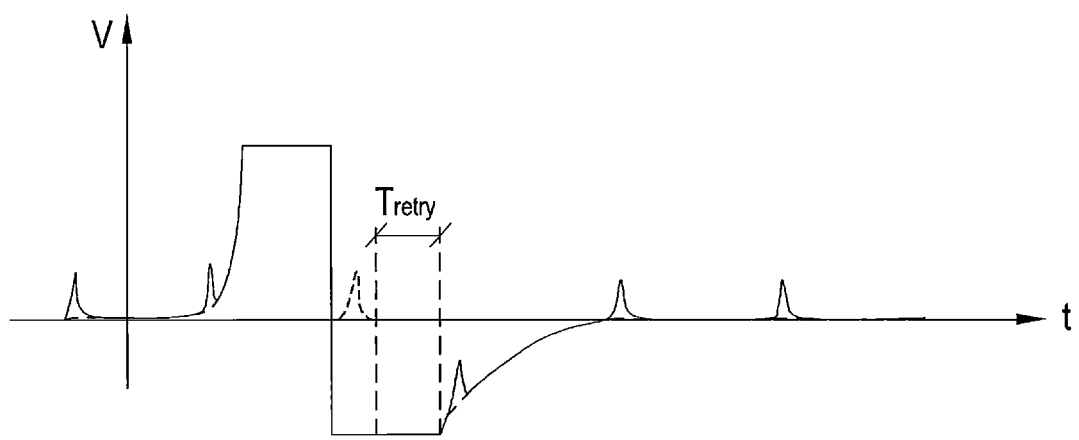
FIG. 8 shows the trend of the electric signal generated by the sensor receiver of FIG. 3 in the presence of noise produced by a flash lamp.

FIG. 8 shows the emission mode of the optoelectronic sensor 10 of FIG. 3, in case, for example, of a flash produced by a flash lamp, which, as is known, creates a condition of saturation in the receiver 30. During saturation, the pulses that might be emitted by the emitter cannot constitute a useful signal for the purposes of the measurement as the amplitude of the noise signal is so high that already by itself it "blinds" the receiver, a further amplitude of the noise added to the noise would simply blind the receiver even more without providing any useful information on the presence or absence of objects or their characteristics. As shown in the figure, thanks to the method of the invention, in the step of saturation, the emitter 20 sends no pulse to the receiver (dashed pulse), resulting in energy savings to the emitter 20.

Figure 9:
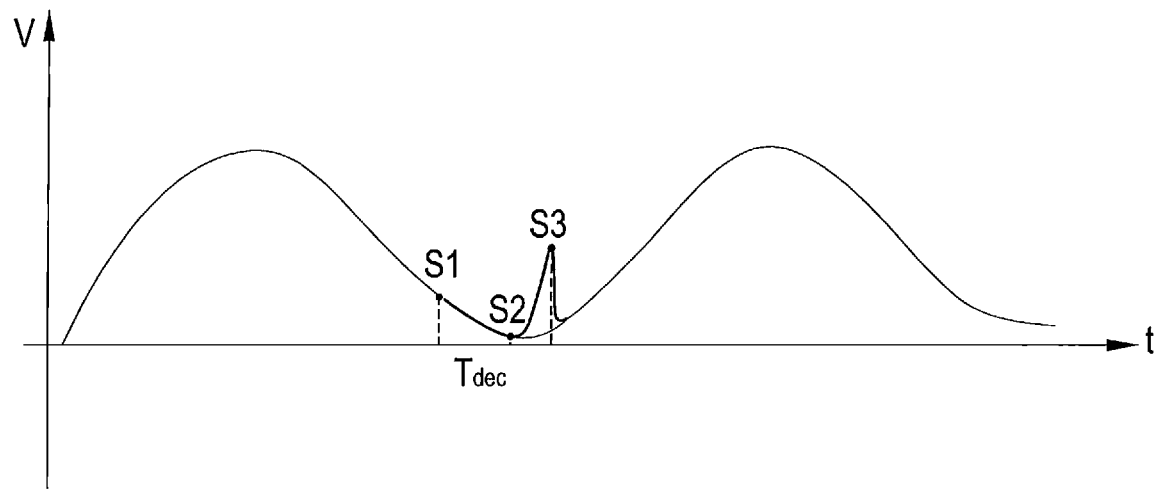
FIG. 9 shows an example of measurement by the sensor of the invention.

FIG. 9 shows a diagram of a measurement signal relating to an example of the invention through a digital circuit, not shown. The principle of operation is similar to that described, however, two measurements of the noise signal during the time $T_{eval}$ are preferably carried out. The signal represented in FIG. 9 is the signal received and amplified by the optoelectronic sensor. A first noise measurement Si is carried out substantially at the beginning of $T_{eval}$, which is compared with the first threshold $V_{threshold1}$ as indicated above. However, in case S1 is less than the first threshold and the pulse is emitted by the emitter (generating the peak in the signal of FIG. 9 denoted with S3), a second noise measurement S2 is carried out, always during $T_{eval}$, and then the measurement signal S3 is detected. The comparison with the second threshold is done in differential mode, i.e. the subtraction of the two measurement and noise signals S3−S2 is carried out and this difference is compared with the constant K. $T_{dec}$ is the time $T_{eval}$ or third time interval in which the decision whether or not to emit the pulse is taken. The difference in the method of the invention is substantially due to the fact that the decision times are generally longer in the digital solution and it is thus useful to essentially sample the noise signal (S2) once more to update its value exactly in the instant in which the pulse emission is performed.

Figure 10:
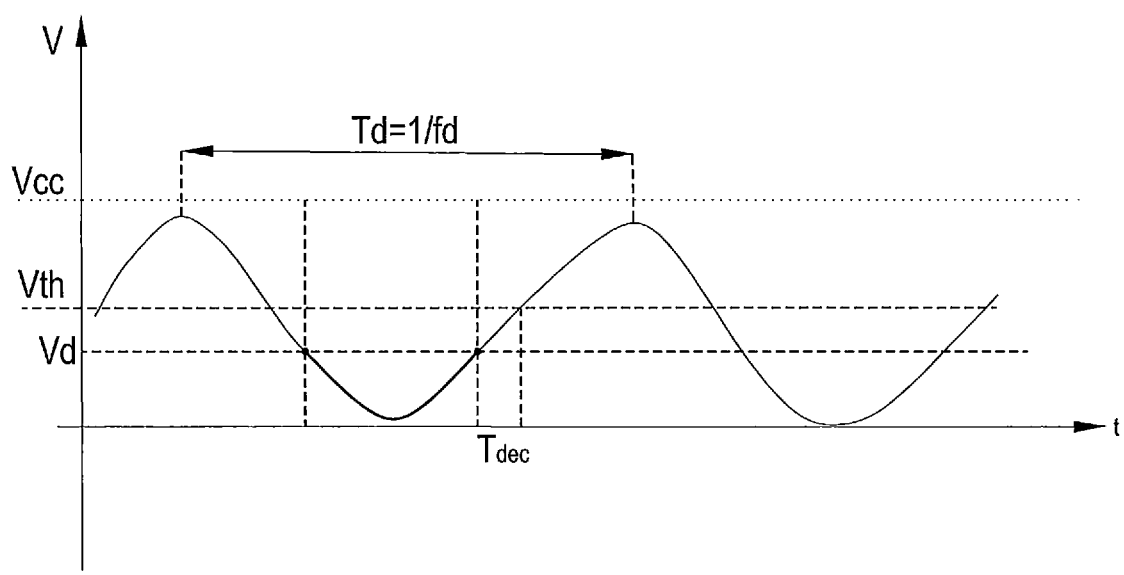
FIG. 10 shows a diagram of an optoelectronic sensor according to the invention.

FIG. 10 instead shows an example of calculating the value of the first threshold. FIG. 10 shows a periodic noise signal, preferably of a much greater period than the period T of the pulse of the emitter, for example, noise generated by a fluorescent lamp. The noise signal has frequency $f_d$ and period $T_d=1/f_d$. $V_{th}$ ($-V_{threshold2}$) is also used to call the second threshold and $V_d$ ($=V_{threshold1}$) the first threshold. $V_{cc}$ represents the maximum voltage that may be present in the amplifier output 6. $T_{dec}$ is the time $T_{eval}$ or third time interval in which the decision whether or not to emit the pulse is made.

If the decision time $T_{dec}$ was null or much less than $T_d$, the first threshold would be equal to $V_d=V_{cc}-V_{th}$. In other cases we have $V_d<V_{cc}-V_{th}$.

A precise calculation can be done by knowing the value of $T_{dec}=T_{eval}$ and the shape of the noise signal. From these parameters, you get that $$V_d=V_{cc}-V_{th}-A_0 \sin[\omega_d(T_{dec}+T)]$$

Where T is the pulse period, $A_0$ is the noise signal amplitude and $\omega_d=2\pi f_d$. The noise is approximated with a sinusoidal shape of constant amplitude; the approximation is good seen that the amplification chain is usually a band-pass filter with respect to the photodiode signal thus allowing only the fundamental harmonic amplification. Also the amplitude will vary in reality because it is a modulated signal; however, it can be considered as a worst case on which to calculate the maximum value for which you want to stay immune.

Preferably $T_{retry}+T_{dec}<T_d$

To avoid always sampling the same part of the noise signal.

If $V_{cc}=2.5$ V, $T_{dec}=T=1$ μs, $A_0=2.5$ V, $\omega_d=2\pi\times50$ Hkz, $V_{th}=0.2$ V is imposed, $V_d=0.831$ V is obtained.

The invention claimed is:

1. A method for the reception of a pulsed electromagnetic radiation emitted by an emitter in an optoelectronic sensor, the sensor including at least an emitter for emitting electromagnetic radiation and a receiver for receiving electromagnetic radiation, the electromagnetic radiation received being converted into an electric signal, said method comprising:
   arranging the emitter to emit a pulsed electromagnetic radiation;
   before the emission of a pulse, receiving an electromagnetic radiation through the receiver by generating a received noise signal;
   comparing an amplitude of the received noise signal with a first threshold via a first comparator;
   emitting the pulse if the amplitude of the received noise signal is below the first threshold, and not emitting the pulse otherwise; and comparing a difference of a measured signal with a second threshold via a second comparator downstream of the first comparator to detect a presence of an object.

2. The method according to claim 1, further comprising predisposing the emitter so to emit a periodic pulsed electromagnetic radiation, two consecutive pulses being spaced apart by a first time interval.

3. The method according to claim 2 further comprising, if the noise signal is below the first threshold:
emitting the pulse;
receiving an electromagnetic radiation in the first time interval in correspondence with the emission of the pulse so as to generate a measurement signal; and
comparing an amplitude of the received measurement signal in correspondence with the emission of said pulse with the second threshold.

4. The method according to claim 3, wherein comparing an amplitude of the received measurement signal in correspondence with the emission of the pulse with a second threshold includes comparing an amplitude of the received measurement signal with a second threshold given by the sum of an amplitude of the received noise signal before the emission of the pulse and a constant value.

5. The method according to claim 3, further comprising:
subtracting an amplitude of the received measurement signal in correspondence with the emission of the pulse with an amplitude of the received measurement signal; and
comparing the difference with a second constant threshold.

6. The method according to claim 1, wherein not emitting the pulse includes, in response to the amplitude of the received noise signal being above the first threshold, delaying the emission of the pulse by a second time interval.

7. The method according to claim 6, further comprising, after delaying the emission of the pulse,
subsequently to the second time interval having elapsed and before the emission of the pulse, repeating receiving an electromagnetic radiation through the receiver by generating a received noise signal;
comparing an amplitude of the received noise signal with the first threshold; and
delaying the emission of the pulse by a second time interval, a number n of times so as to emit the pulse when the received noise signal before its emission has an amplitude below the first threshold.

8. The method according to claim 1, including:
comparing an amplitude of the received signal with the first threshold during a third time interval directly previous emission of the pulse.

9. The method according to claim 1, further comprising, prior to comparing an amplitude of the received electromagnetic noise signal with a first threshold or prior to comparing an amplitude of the received electromagnetic measurement signal of with a second threshold, amplifying the received noise or measurement signal.

10. The method according to claim 1, further comprising: converting the received analog signal into a digital signal.

11. The method according to claim 1, wherein the first threshold is dependent on the maximum amplitude of the pulse, and/or the third time interval and/or the second threshold and/or the first time interval.

12. An optoelectronic sensor including:
an emitter arranged for emitting a pulsed electromagnetic radiation;
a receiver arranged for receiving an electromagnetic radiation and converting the electromagnetic radiation into an electric signal, and including a first circuit detecting a noise signal corresponding to an electromagnetic radiation received prior to the emission of the pulse;
a first comparator arranged for comparing an amplitude of the noise signal with a first threshold;
an actuator circuit configured to control the emitter so as to enable the emission of a pulse at the end of the first time interval only if the amplitude of the noise signal is below the first threshold and not to enable the emission otherwise; and
a second comparator downstream of the first comparator and arranged for comparing the difference with the second threshold to detect a presence of an object.

13. The optoelectronic sensor according to claim 12, wherein said emitter is arranged for emitting a periodic electromagnetic radiation at pulses spaced apart from one another by a first time interval.

14. The optoelectronic sensor according to claim 13, wherein the second time interval is less than the first time interval.

15. The optoelectronic sensor according to claim 12, including a delay circuit, arranged for controlling the emitter and delaying the emission of the pulse by a second time interval in response to the amplitude of the received noise signal being above the first threshold.

16. The optoelectronic sensor according to claim 12, wherein the receiver includes a second circuit detecting a measurement signal corresponding to an electromagnetic radiation received during the emission of the pulse.

17. The optoelectronic sensor according to claim 16, wherein the second threshold is given by the sum of an amplitude of the noise signal received prior to the emission of the pulse and a constant.

18. The optoelectronic sensor according to claim 16, wherein the second threshold is a constant, and further including an adder arranged for subtracting the noise signal from a signal received after the emission of a pulse to compute a difference and a second comparator arranged for comparing the difference with the second threshold.

19. The optoelectronic sensor according to claim 12, wherein the receiver includes an amplifier stage for amplifying the noise or measurement signal, and said first and said second comparator being positioned downstream of said amplifier stage.

20. The optoelectronic sensor according to claim 12, further comprising an analog/digital converter arranged for converting the noise or measurement signal into a digital signal.

21. The optoelectronic sensor according to claim 12, wherein the pulse includes a pulse train spaced one from the other by a fourth time interval shorter than the first time interval.

* * * * *